(12) United States Patent
Huang

(10) Patent No.: US 8,365,207 B2
(45) Date of Patent: Jan. 29, 2013

(54) DISK STORAGE APPARATUS AND METHOD FOR STORING AND REMOVING DISKS USING THE SAME

(75) Inventor: Yao Hsing Huang, Taoyuan County (TW)

(73) Assignee: Daxon Technology Inc., Tao-Yuan Hsien (TW)

( * ) Notice: Subject to any disclaimer, the term of this patent is extended or adjusted under 35 U.S.C. 154(b) by 1287 days.

(21) Appl. No.: 12/123,517

(22) Filed: May 20, 2008

(65) Prior Publication Data

US 2009/0007164 A1     Jan. 1, 2009

(30) Foreign Application Priority Data

Jun. 28, 2007   (TW) ................................ 96123447 A

(51) Int. Cl.
  *G11B 33/02*     (2006.01)
  *B65D 85/30*     (2006.01)

(52) U.S. Cl. ..................................... 720/601; 206/308.1

(58) Field of Classification Search .................. 206/303, 206/307, 308.1, 308.2, 309–313, 445, 493; 312/9.41–9.44, 9.47–9.61, 9.64; 369/42.01, 369/75.21, 179, 181, 289.1–291.1; 720/600, 720/652, 655, 718, 601–616, 725
See application file for complete search history.

(56) References Cited

U.S. PATENT DOCUMENTS

| | | | | |
|---|---|---|---|---|
| 5,692,878 A | * | 12/1997 | Freund | 414/796.6 |
| 5,718,559 A | * | 2/1998 | Freund | 414/797 |
| 6,590,849 B1 | * | 7/2003 | Yamauchi et al. | 720/607 |
| 2004/0154031 A1 | * | 8/2004 | Kimura et al. | 720/613 |
| 2006/0020955 A1 | * | 1/2006 | Jin | 720/647 |
| 2006/0161927 A1 | * | 7/2006 | Kuo | 720/600 |

* cited by examiner

*Primary Examiner* — Nathan Danielsen
(74) *Attorney, Agent, or Firm* — Volpe and Koenig, P.C.

(57) ABSTRACT

The present invention provides a disk storage apparatus including a base, a transmission unit, an actuation unit, and a tray. The transmission unit is disposed on the base. The transmission unit is movably connected to the actuation unit. The tray is provided to support at least one disk. The tray and the transmission unit are movably connected to each other. The actuation unit drives the transmission unit to cause the tray to move relatively to the base.

15 Claims, 5 Drawing Sheets

DISK STORAGE APPARATUS AND METHOD FOR STORING AND REMOVING DISKS USING THE SAME

BACKGROUND OF THE INVENTION

The present invention relates to a disk storage apparatus and the method for using the same. More specifically, the present invention is related to a disk storage apparatus for storing and removing disks conveniently. The present invention is especially for storing optical disks, such as CD-R or DVD disks.

As the volume of data increases, the need for data storage disks becomes more and more important. As a result, disk storage apparatus also becomes more popular. Referring to FIG. 4, FIG. 4 shows a known disk storage apparatus, comprising a base 400, an axial pole 402, and an outer shell 404. The axial pole 402 is disposed perpendicularly to the base 400, and disks are put through the axial pole 402 and stacked on top of each other. The outer shell 404 is then put on the base 400 to contain the disks inside the known disk storage apparatus for storage and dust prevention.

When the above mentioned disk storage apparatus is used to stored disks, the disks are put through the axial pole 402 to secure the disks on the base 400 and prevent the disks from shifting position. However, storing disks this way is restricted to storing disks vertically, and when storing or removing disks, a user must remove the outer shell first, thus adding inconvenience to storing disks.

SUMMARY OF INVENTION

The present invention provides a disk storage apparatus that stores and removes disks with ease using a mechanical structure. The disk storage apparatus also provides dust prevention effect.

An embodiment of the invention includes a disk storage apparatus, comprising a base, a transmission unit, an actuation unit, and a tray. The transmission unit is disposed on the base; the actuation unit and the transmission unit are connected in a way so the actuation unit drives the transmission unit when actuated. When the actuation unit is actuated, the transmission unit drives the tray to move relatively to the base.

Another embodiment of the invention provides a disk storage apparatus, wherein the transmission unit of the disk storage apparatus further comprises a gear module and a screw, and the tray has a connecting portion connected to the screw. The connecting portion has screw threads. When the actuation unit is actuated, the gear module is driven to rotate the screw, and the tray moves when the screw rotates relatively to the screw threads.

DETAILED DESCRIPTION OF THE INVENTION

A disk storage apparatus is disclosed in the present invention. Please refer to FIG. 1-3 for better understanding of the present invention.

Figure 1:
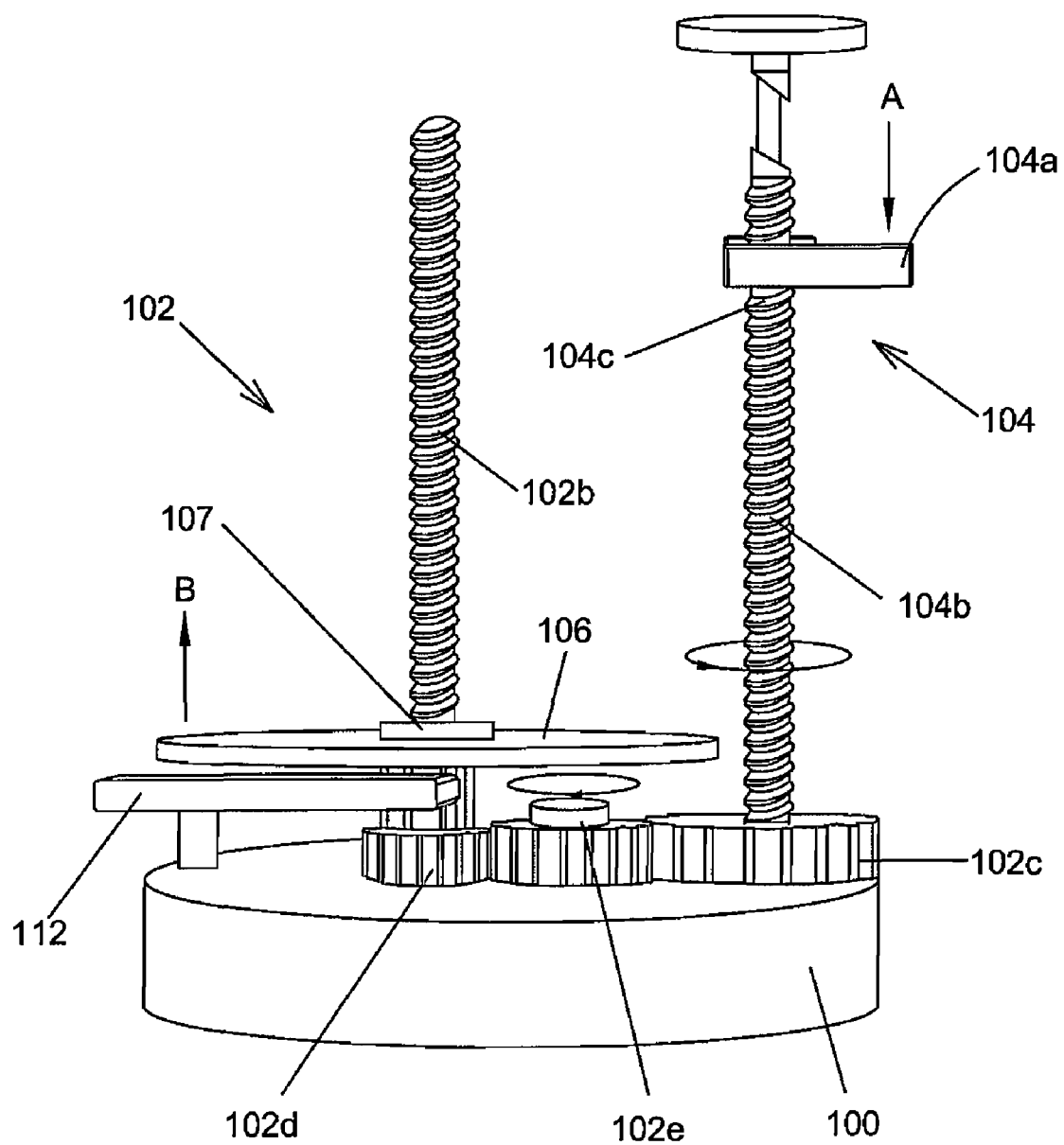
FIG. 1 is a side view of an embodiment of a disk storage apparatus of the present invention.

FIG. 1 depicts an embodiment of a disk storage apparatus of the present invention, comprising a base 100, a transmission unit 102, an actuation unit 104, and a tray 106. The actuation unit 104 comprises a plate 104a and a connecting rod 104b, and the connecting rod 104b is disposed perpendicularly to the base 100. The plate 104a has a screw thread hole 104c where the connecting rod 104b passes through the screw thread hole 104c, and the screw threads of the connecting rod 104b match the screw threads of the screw thread hole 104c. The transmission unit 102 comprises a screw 102b, a first gear 102c, a second gear 102d, and a third gear 102e. The third gear 102e engages with the first gear 102c and the second gear 102d. The first gear 102c, the second gear 102d, and the third gear 102e form a gear module and are linked together. The screw 102b is disposed perpendicularly on the base 100. The connecting rod 104b and the first gear 102c rotate along the same axis. The screw 102b and the second gear 102d rotate along the same axis. The tray 106 is connected to the screw 102b, and the tray 106 has a screw thread hole 107 for the screw 102b to pass through. The screw threads of screw 102b match to the screw thread hole 107.

When the actuation unit 104 is actuated, such as when a user pushes downward by hand (arrow A) or pulls upward on the plate 104a, the plate 104a drives the connecting rod 104b to rotate, and the first gear 102c connected to the connecting rod 104b rotates as well. The first gear 102c then moves the third gear 102e and the second gear 102d, which in term cause the tray 106 to move upward (arrow B) or downward relatively to the base 100 so the user can either remove or store the disk on the tray 106. In this embodiment, the first gear 102c has a diameter greater than the third gear 102e, and the third gear 102e has a diameter greater than the second gear 102d. This results in less effort for actuating the actuation unit 104. However, the diameters of the first, second, and third gears 102c, 102d, 102e are not limited by this embodiment, and the numbers of the teeth of the gears are also not limited by this embodiment.

In another embodiment not shown in the figures, the transmission unit 102 includes the screw 102b and a belt connected to the screw 102b and to the connecting rod 104b. When the actuation unit is actuated, the actuation unit drives the connecting rod 104b to rotate. The screw 102b and the belt begin to rotate when the connecting rod 104b rotates.

Referring again to FIG. 1, a fixing component 112 selectively restricts the transmission unit 102, such as the fixing component 112 and the second gear 102d interlocking each other, resulting in the tray 106 being fixed at a desired location. In another embodiment, the fixing component 112 interlocks with the third gear 102e to fix the tray 106 at a desired location by the user. In yet another embodiment, the fixing component 112 interlocks the actuation unit 104. However, as long as the tray can be stopped and fixed at a desired location, the fixing component 112 is not limited to the above-mentioned locations.

Figure 2A:
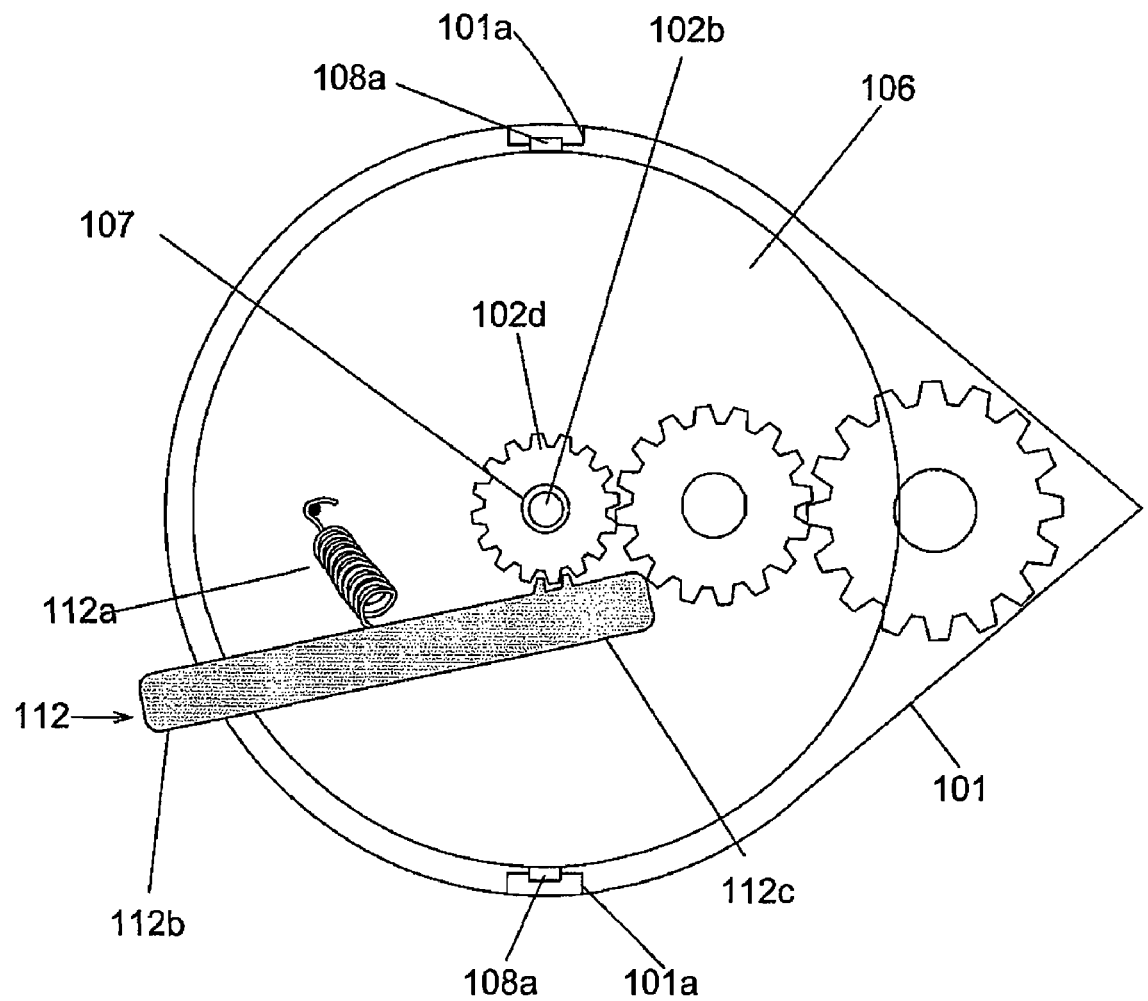
FIG. 2a is a top view of another embodiment of a disk storage apparatus of the present invention.

FIG. 2a is a top view of the disk storage apparatus further showing the fixing component 112, the tray 106, and the case 101 of the disk storage apparatus. In this embodiment, the fixing component 112 includes a spring 112a, a press portion 112b, and a hook 112c. One end of the fixing component 112 is movably connected to the base 100, and the end of the fixing component 112 is hooked to the second gear 102d by the hook 112c and spring force of the spring 112b to hold the second gear 102d in place. When the press portion 112b is pressed, the hook 112c is released from the second gear 102d, and the second gear 102d is free to rotate when the transmission unit rotates.

Figure 2B:
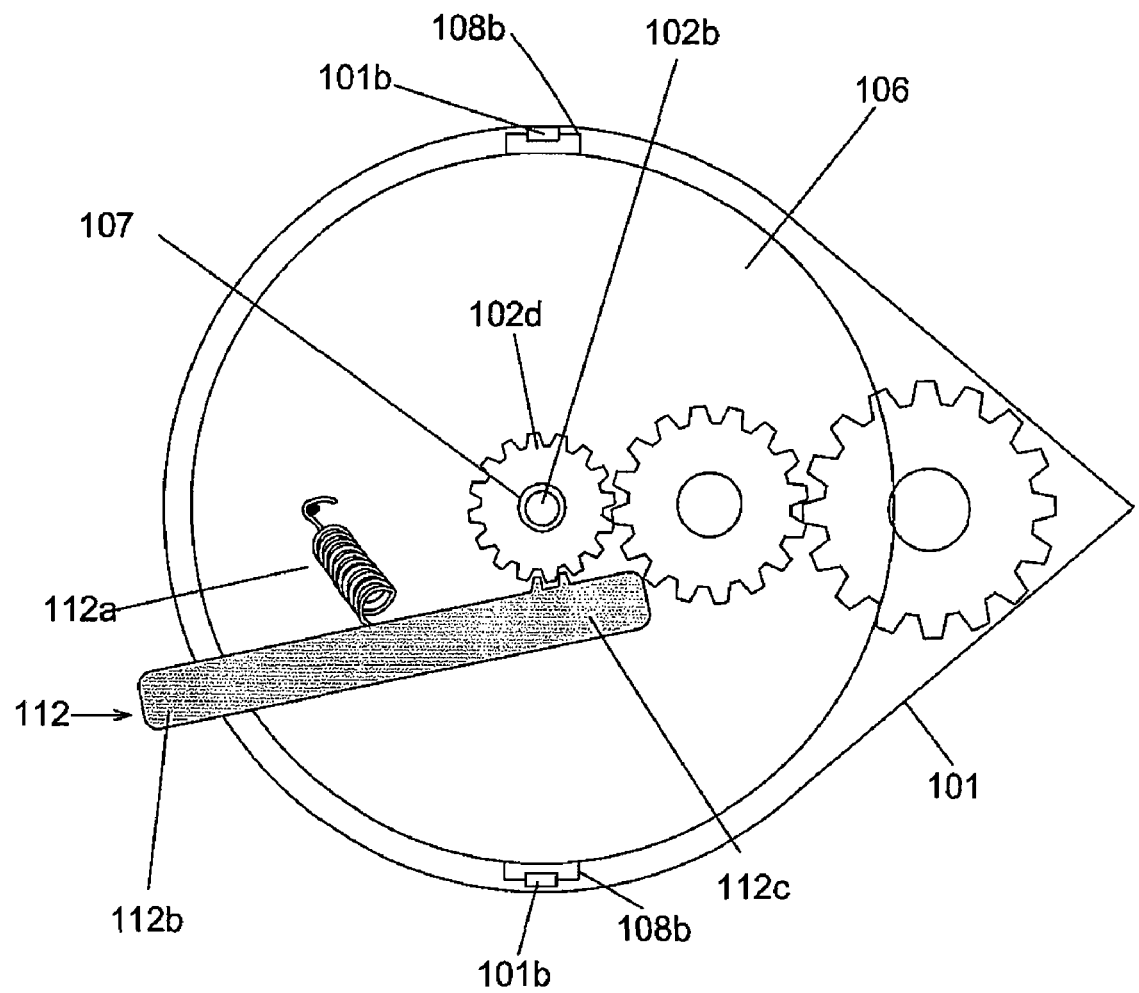
FIG. 2b is a top view of another embodiment of a disk storage apparatus of the present invention.

Referring to FIG. 2a, the tray 106 has a screw thread hole 107, and the screw 102b passes through the screw thread hole 107. The tray 106 has a protruding portion 108a on the edge and is engaged to a concaving track 101a of the case 101. When the screw 102b rotates, the tray 106 does not rotate with the screw 102b, but moves up and down relatively to the base 100. Referring to FIG. 2b for another embodiment, the tray 106 has a concaving portion 108b on the edge and is engaged to a protruding track 101b of the case 101. The tray moves up and down relatively to the base 100 when the screw 102b rotates, but the tray 106 does not rotate with the screw 102b. The tray 106 is for loading disks. When storing disks, the screw 102b is passed through the holes at the center of the disks, which are stacked onto the tray 106. Using this design, a user does not need to extend his or her hand into the case 101 to store or remove the disks on the tray 106.

Figure 3:
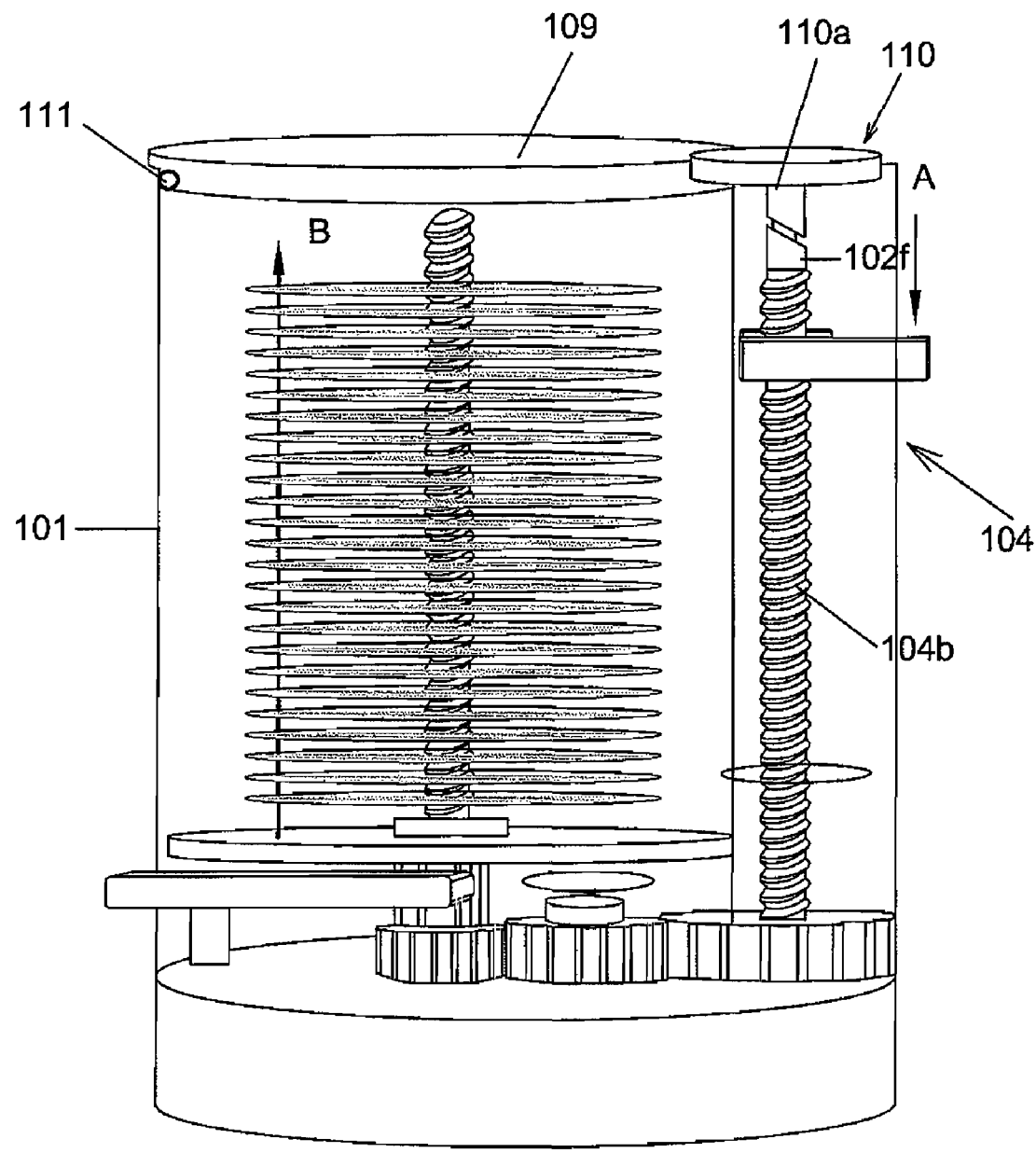
FIG. 3 is a side view of another embodiment of a disk storage apparatus of the present invention.
Figure 4:
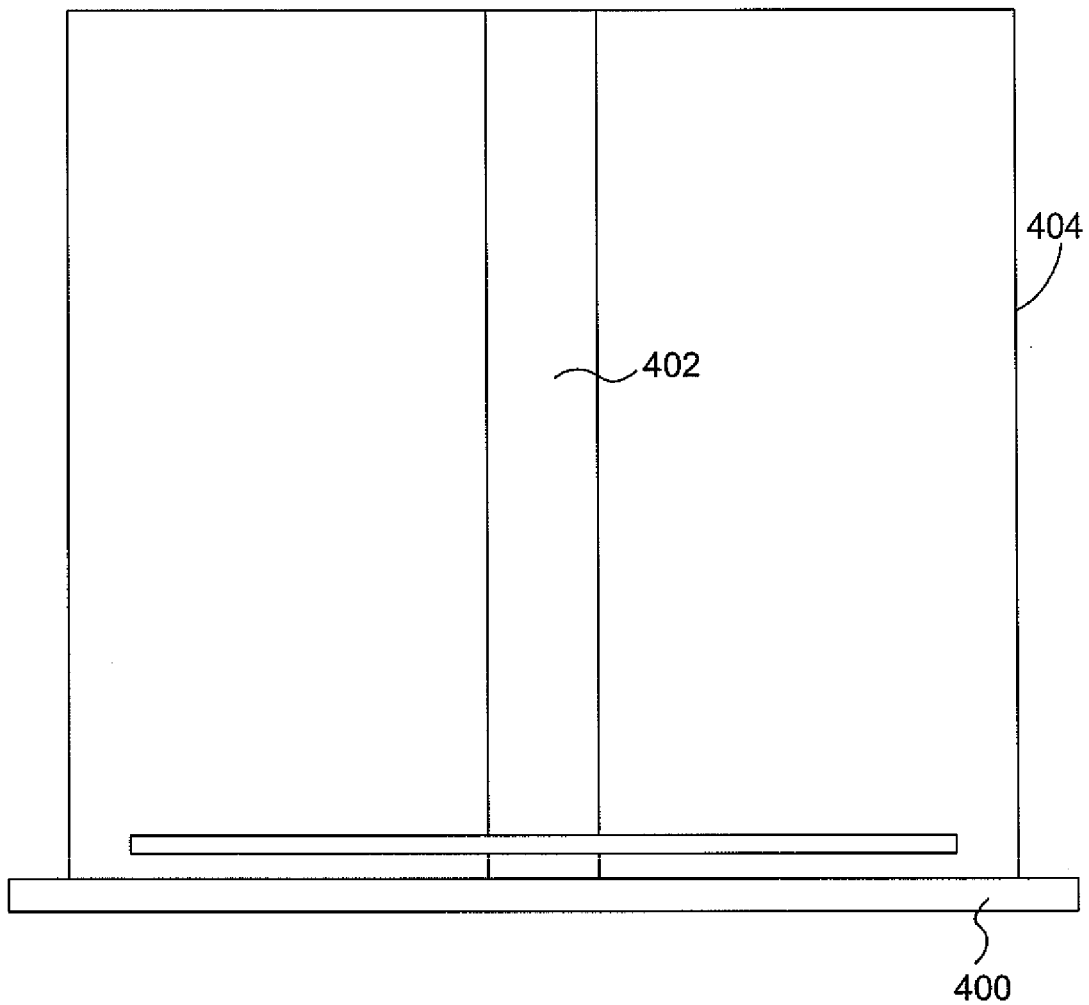
FIG. 4 is a disk storage apparatus in the prior art.

FIG. 3 shows an embodiment of an opening part 110 and the connecting rod 104b of the disk storage apparatus of the present invention. The opening part 110 has a first inclined surface 110a and the connecting rod 104b has a second inclined surface 102f. When the opening part 110 is closed, the first inclined surface 110a and the second inclined surface 102f are parallel to each other. When the actuation unit 104 is actuated, the connecting rod 104b causes the second inclined surface 102f to rotate, and the first inclined surface 110a is pushed upward by the second inclined surface 102f to move the opening part 110 and open a cover 109. The cover 109 has a spring device 111 connected to the case 101, and the cover 109 moves relatively to the case 101 via the force of the spring device 111. While moving the opening part 110, the cover 109 is open by the spring force. To close the cover 109, a user can push the cover 109 to engage the opening part 110. When the cover 109 is closed, the cover 109, the case 101, and the base 100 form a storage space. Disks are stored in the storage space, and dusts and fluids are prevented from getting inside.

While the invention has been described with reference to exemplary embodiments, it is to be understood by those skilled in the art that various changes may be made and equivalents substituted for elements thereof without departing from the scope of the invention. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A disk storage apparatus, comprising: a base; a transmission unit, disposed on the base; an actuation unit, the transmission unit is activated by the actuation unit; and a tray, for loading at least one disk, the tray and the transmission unit are movably connected; wherein when the actuation unit is actuated, the transmission unit drives the tray to move relatively to the base; wherein the transmission unit comprises a gear module and a screw; and wherein the tray has a connecting portion connected to the screw, and the connecting portion has screw threads, wherein the actuation unit drives the gear module to rotate the screw, and the tray moves when the screw rotates relatively to the screw threads.

2. The disk storage apparatus of claim 1, wherein the actuation unit comprises a plate and a connecting rod, when an external force is exerted to the plate, the connecting rod drives the transmission unit.

3. The disk storage apparatus of claim 2, wherein the plate has an abutting portion abutted to the connecting rod, and the abutting portion has screw threads, when the external force is exerted on the plate, the plate moves when the connecting rod moves relative to the screw threads.

4. The disk storage apparatus of claim 1 further comprising a case connected to the base, wherein the tray and the case are movably connected.

5. The disk storage apparatus of claim 4, wherein the case has at least one protruding track, and the tray has at least one cavity corresponding to the at least one protruding track, the tray is moved relatively to the base along the at least one protruding track.

6. The disk storage apparatus of claim 4, wherein the case has at least one concaving track, and the tray has at least one protrusion corresponding to the at least one concaving track, the tray is moved relatively to the base along the at least one concaving track.

7. The disk storage apparatus of claim 4 further comprising a cover movably connected to the case, and the base, the case, and the cover together form a storage space for storing disks.

8. The disk storage apparatus of claim 7 further comprising an opening part, the actuation unit drives the opening part to open the cover and the storage space.

9. The disk storage apparatus of claim 8, wherein the opening part has a first inclined surface, and the actuation unit has a second inclined surface corresponding to the first inclined surface, when the actuation unit is actuated, the first inclined surface of the opening part is moved relatively to the second inclined surface of the actuation unit.

10. The disk storage apparatus of claim 7, wherein the cover is connected to the case via a spring, and the cover moves relatively to the case via the spring force of the spring.

11. The disk storage apparatus of claim 1 further comprising a fixing component, when the actuation unit is actuated, the fixing component selectively restricts the tray to move relatively to the base.

12. The disk storage apparatus of claim 11, wherein the fixing component comprises a hook, which selectively engages to the transmission unit.

13. The disk storage apparatus of claim 11, wherein the fixing component comprises a hook, which selectively engages to the actuation unit.

14. A method for storing and removing disks using the disk storage apparatus of claim 1, the method comprising: placing at least one disk on the tray; and actuating the actuation unit to drive the transmission unit so the tray moves relatively to the base.

15. A method for storing and removing disks using the disk storage apparatus of claim 8, the method comprising:
placing at least one disk on the tray; and
actuating the actuation unit to drive the transmission unit so the tray moves relatively to the base, and the opening part is triggered to open the cover and the storage space.

* * * * *